US009990369B2

(12) United States Patent
Guo et al.

(10) Patent No.: US 9,990,369 B2
(45) Date of Patent: Jun. 5, 2018

(54) METHOD AND APPARATUS FOR SCANNING FILES

(71) Applicant: Baidu Online Network Technology (Beijing) Co., Ltd, Beijing (CN)

(72) Inventors: Mingqiang Guo, Beijing (CN); Yongcheng Zhang, Beijing (CN)

(73) Assignee: BAIDU ONLINE NETWORK TECHNOLOGY (BEIJING) CO., LTD (CN)

( * ) Notice: Subject to any disclaimer, the term of this patent is extended or adjusted under 35 U.S.C. 154(b) by 525 days.

(21) Appl. No.: 14/587,891

(22) Filed: Dec. 31, 2014

(65) Prior Publication Data
US 2016/0055168 A1 Feb. 25, 2016

(30) Foreign Application Priority Data

Aug. 25, 2014 (CN) .......................... 2014 1 0422911

(51) Int. Cl.
G06F 17/30 (2006.01)
G06F 21/56 (2013.01)
(52) U.S. Cl.
CPC .... G06F 17/30144 (2013.01); G06F 17/3007 (2013.01); G06F 21/562 (2013.01)
(58) Field of Classification Search
None
See application file for complete search history.

(56) References Cited

U.S. PATENT DOCUMENTS 5,931,935 A * 8/1999 Cabrera ................ G06F 13/102
710/260
6,321,219 B1 * 11/2001 Gainer .............. G06F 17/30067
(Continued)

OTHER PUBLICATIONS

Anonymous, "Reparse Points and File Operations (Windows)," Microsoft.com, Apr. 22, 2013, pp. 1-2 XP055243625, Retrieved from the Internet: https://web.archive.org/web/20130422171733/http://msdn.microsoft.com/en-us/library/windows/desktop/aa365505(v=vs.85).aspx.
(Continued)

Primary Examiner — Debbie Le
(74) Attorney, Agent, or Firm — Orrick, Herrington & Sutcliffe LLP

(57) ABSTRACT

A method and apparatus for scanning files, wherein the method comprises: during the traversing of a directory, performing first processing on the traversed directory, the first processing comprising: acquiring a directory attribute of the traversed directory, and determining whether the traversed directory is a remapped directory according to the acquired directory attribute, and if so, performing no scanning processing on the traversed directory, and if not, performing scanning processing on the traversed directory, with the scanning processing comprising: scanning various files in the traversed directory to acquire a scanning result, and/or, performing second processing on various sub-directories in the traversed directory; and the second processing comprises: traversing the various sub-directories, and performing the same processing as the first processing on the traversed sub-directories. The IO overhead and CPU overhead during scanning can be effectively reduced by means of the present invention, thus improving the file scanning efficiency.

18 Claims, 2 Drawing Sheets

(56) References Cited

U.S. PATENT DOCUMENTS

| | | | | |
|---|---|---|---|---|
| 7,421,560 B2* | 9/2008 | Thind | | G06F 3/0605 |
| | | | | 707/999.001 |
| 7,523,343 B2* | 4/2009 | Leis | | G06F 11/0727 |
| | | | | 714/5.11 |
| 7,822,726 B1* | 10/2010 | Cardin | | G06F 11/1435 |
| | | | | 707/702 |
| 8,666,953 B2* | 3/2014 | Semerdzhiev | | G06F 17/30067 |
| | | | | 707/695 |
| 8,726,388 B2* | 5/2014 | Turbin | | G06F 21/566 |
| | | | | 726/24 |
| 8,856,080 B2* | 10/2014 | Khanzode | | G06F 11/1458 |
| | | | | 707/654 |
| 9,063,947 B2* | 6/2015 | Forman | | G06F 17/30156 |
| 9,069,992 B1* | 6/2015 | Vaikar | | G06F 21/6218 |
| 9,128,944 B2* | 9/2015 | Shiell | | G06F 17/30091 |
| 9,176,974 B1* | 11/2015 | Burr | | G06F 17/30106 |
| 9,223,797 B2* | 12/2015 | Wang | | G06F 11/1453 |
| 9,262,187 B2* | 2/2016 | Sheehan | | G06F 9/45533 |
| 9,547,657 B2* | 1/2017 | Weinstein | | G06F 17/30109 |
| 2008/0065637 A1* | 3/2008 | Farlee | | G06F 17/30067 |
| 2010/0023563 A1* | 1/2010 | Thadvai | | G06F 17/30076 |
| | | | | 707/E17.01 |

OTHER PUBLICATIONS

Anonymous, "NTFS reparse point," Wikipedia, Jun. 11, 2014, pp. 1-6, XP055243706, Retrieved from the Internet: https://en.wikipdia.org/w/index.php?title=NTFS_reparse_point&oldid=612534492.

* cited by examiner

METHOD AND APPARATUS FOR SCANNING FILES

CROSS-REFERENCE TO RELATED APPLICATIONS

The present application claims priority to Chinese Patent Application No. CN201410422911.3, filed on Aug. 25, 2014, the entire disclosure of which is incorporated herein by reference in its entirety and for all purposes.

TECHNICAL FIELD

The present invention relates to the field of file scanning, and in particular to a method and apparatus for scanning files.

BACKGROUND

There are many directories which are remapped into a certain directory in an operating system, and in the existing file scanning technology, a scanning engine is invoked to execute time-consuming actions such as reading files under these directories, and calculating features. This makes the scanning engine do a lot of futile work, which increases the input and output (IO) overhead and the central processing unit (CPU) overhead during scanning, and reduces the scanning efficiency.

SUMMARY

In order to solve the defects of the existing file scanning technology, a method and apparatus for scanning files are provided in the embodiments of the present invention so that the IO overhead and CPU overhead during scanning can be reduced, thus improving the file scanning efficiency.

In one aspect, an embodiment of the present invention provides a method for scanning files, comprising:

during the traversing of a directory, performing first processing on the traversed directory, with the first processing comprising:

acquiring a directory attribute of the traversed directory, and determining whether the traversed directory is a remapped directory according to the acquired directory attribute, and if so, performing no scanning processing on the traversed directory, and if not, performing scanning processing on the traversed directory, with the scanning processing comprising:

scanning various files in the traversed directory to acquire a scanning result, and/or, performing second processing on various sub-directories in the traversed directory;

wherein performing second processing on various sub-directories in the traversed directory comprises: traversing the various sub-directories, and performing the same processing as the first processing on the traversed sub-directories.

In an implementation of the embodiments of the present invention, acquiring a directory attribute of the traversed directory comprises: acquiring a directory attribute of the traversed directory through a Microsoft Windows operating system application program interface.

In another implementation of the embodiments of the present invention, determining whether the traversed directory is a remapped directory according to the acquired directory attribute comprises: determining whether a FILE_ATTRIBUTE_REPARSE_POINT attribute flag is contained in the acquired directory attribute, and if it is contained, the traversed directory being a remapped directory; and if it is not contained, the traversed directory not being a remapped directory.

In still another implementation of the embodiments of the present invention, the method further comprises: after determining that the traversed directory is a remapped directory, traversing to a next directory, or, after completing the scanning processing on the traversed directory, traversing to a next directory.

Accordingly, an embodiment of the present invention further provides an apparatus for scanning files, comprising:

a directory traversing unit for traversing a directory;

a first processing unit for performing first processing on the directory traversed by the directory traversing unit, with the first processing comprising:

acquiring a directory attribute of the traversed directory, and determining whether the traversed directory is a remapped directory according to the acquired directory attribute, and if so, performing no scanning processing on the traversed directory, and if not, performing scanning processing on the traversed directory, with the scanning processing comprising:

scanning various files in the traversed directory to acquire a scanning result, and/or, invoking a second processing unit to perform processing on various sub-directories in the traversed directory; and the second processing unit for traversing various sub-directories in the traversed directory, and performing the same processing as the first processing on the traversed sub-directories.

In an implementation of the embodiments of the present invention, the first processing unit comprises: a directory attribute acquisition module for acquiring a directory attribute of the traversed directory through a Microsoft Windows operating system application program interface.

In another implementation of the embodiments of the present invention, the first processing unit comprises: a determination module for determining whether the traversed directory is a remapped directory according to whether a FILE_ATTRIBUTE_REPARSE_POINT attribute flag is contained in the acquired directory attribute, and if it is contained, the traversed directory being a remapped directory; and if it is not contained, the traversed directory not being a remapped directory.

In yet another implementation of the embodiments of the present invention, the directory traversing unit is further used for traversing to a next directory after the first processing unit determines that the traversed directory is a remapped directory, or after the first processing unit completes the scanning processing on the traversed directory.

Using various embodiments of the present invention has the following beneficial effects:

determining whether a currently traversed directory is a remapped directory according to a directory attribute of the directory, and scanning processing is performed on the files in the directory only in the case that it is judged that it is not, such that during the entire scanning process, scanning processing will not be performed repeatedly on the directory with a remapping relationship, and it is only required to scan the same files, which effectively reduces the IO overhead and CPU overhead during scanning, and improves the file scanning efficiency.

BRIEF DESCRIPTION OF THE ACCOMPANYING DRAWINGS

DETAILED DESCRIPTION OF THE PREFERRED EMBODIMENTS

The aspects of the present invention are further described in detail below in conjunction with the accompanying drawings and embodiments. Well-known modules and units, and connections, links, communications or operations therebetween are not illustrated or are not described in detail. In addition, the features, architectures or functions described may be combined in any manner in one or more of the embodiments. Those of ordinary skill in the art shall understand that the following various embodiments are merely used for illustration, and are not used to limit the scope of protection of the present invention. It should also be readily understood that modules or units or steps in various embodiments described herein and illustrated in the accompanying drawings may be combined and designed according to various different configurations.

Figure 1:
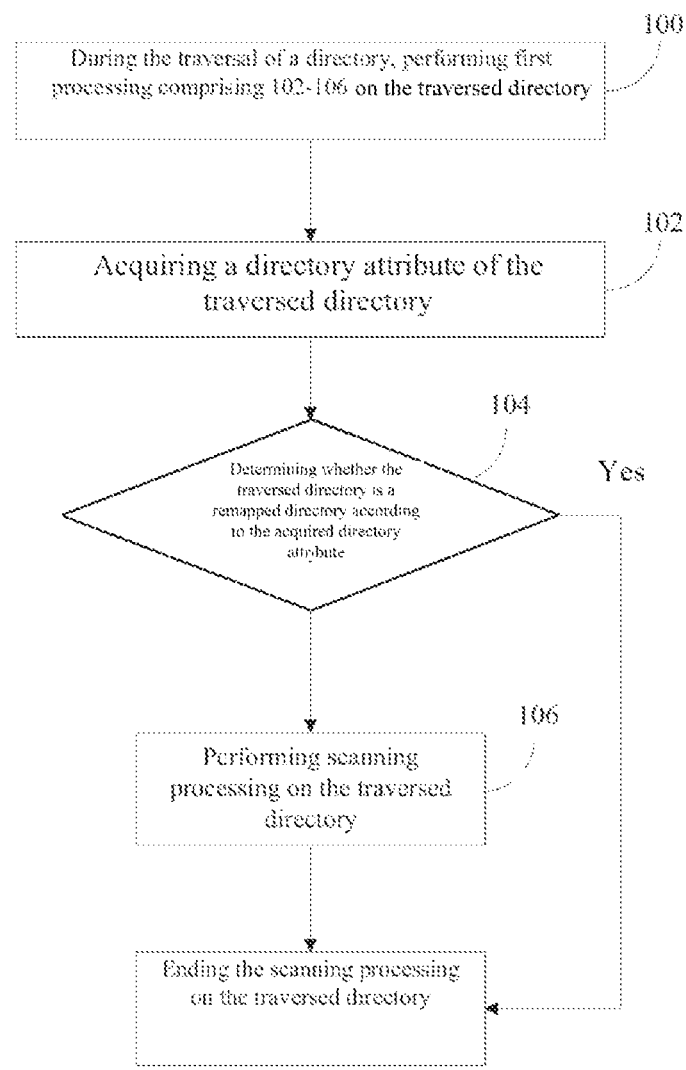
FIG. 1 is a schematic flowchart of a method for scanning files according to an embodiment of the present invention.

FIG. 1 is a schematic flowchart of a method for scanning files according to an embodiment of the present invention, and referring to FIG. 1, the method comprises:

100: during the traversing of a directory, first processing comprising 102-106 is performed regarding the traversed directory.

The directory is a pointer identifying a file home point in a file system structure, such as the "Users" directory in the system installation disk of Microsoft Windows operating system version 7 and an "All Users" directory in the "Users" directory.

The embodiments of the present invention may be applied to a scenario where files in a specified path (such as a specified disk identifier and a specified folder) serve as scanning objects. For example, when the files in the system installation disk are taken as scanning objects (i.e. performing file scanning on the system installation disk), traversing the directory in the system installation disk, and each time a directory is traversed, it is processed using the method provided in the embodiments of the present invention.

The so-called "traversing" is accessing objects to be processed once successively. For example, taking directory A, directory B and directory C as objects to be processed, when traversing to directory A, directory A is currently the object to be processed; and after directory A is processed, traversing continues, and when traversing to directory B, directory B is currently the object to be processed, and so on.

102: a directory attribute of the traversed directory is acquired. It shall be emphasized that the "directory attribute" mentioned in the present invention refers to an attribute corresponding to a directory in a file system.

Optionally, in an implementation of the present embodiment, a directory attribute of the traversed directory may be acquired through a Microsoft Windows operating system application program interface GetFileAttributes or GetFileAttributesEx, or the like. GetFileAttributes is used to return to a specified file or directory an attribute thereof in the file system, and GetFileAttributesEx can return even more attributes. Of course, means for acquiring a directory attribute may be any existing means, but is not limited to the above-mentioned examples.

104: it is judged whether the traversed directory is a remapped directory according to the acquired directory attribute, and if it is judged not to be, 106 is executed, otherwise, 106 is not executed.

Those of ordinary skill in the art shall understand that, for example, directory B is remapped to directory A, and the effect thereof is that when directory A is opened, the contents in directory B can be seen, i.e. directory A and directory B have the same contents. Directory A therein is the remapped directory, and a directory attribute of directory A may contain a FILE_ATTRIBUTE_REPARSE_POINT attribute flag.

Optionally, in another implementation of the present embodiment, determining whether the traversed directory is a remapped directory according to whether a FILE_ATTRIBUTE_REPARSE_POINT attribute flag is contained in the acquired directory attribute, and if it is contained, the traversed directory is a remapped directory, otherwise, it is not a remapped directory.

Further, an existing computation method relevant to operations may optionally be used to judge whether the acquired directory attribute contains a FILE_ATTRIBUTE_REPARSE_POINT attribute flag.

106: scanning processing is performed on the traversed directory.

The scanning processing comprises: scanning various files in the traversed directory to acquire a scanning result, and/or, performing second processing on various sub-directories in the traversed directory. Performing second processing on various sub-directories in the traversed directory comprises: traversing various sub-directories, and performing the same processing as the first processing on the traversed sub-directories.

In the present embodiment, more specifically, if a file is contained in the traversed directory, the contained file is scanned to acquire a scanning result; if a sub-directory is contained in the traversed directory, second processing is performed on the contained sub-directory; and if a file and a sub-directory are both contained in the traversed directory, the above-mentioned processing is performed simultaneously.

For example, a "Default" sub-directory and a "Default User" sub-directory are contained in the "User" directory (which is a non-remapped directory) (for ease of description, here, it is merely described as having these two sub-directories, and of course, in actual conditions, a "User" directory may also contains other sub-directories). When using the method provided in the embodiments of the present invention to perform scanning processing on the "Users" directory, successively traversing performed on the "Default" sub-directory and "Default User" sub-directory. When traversing to the "Default" sub-directory, first processing is performed on the "Default" sub-directory, comprising: acquiring a directory attribute of the "Default" sub-directory and finding that it does not contain a FILE_ATTRIBUTE_REPARSE_POINT attribute flag, then performing scanning processing on the "Default" sub-directory.

The scanning processing on a "Default" sub-directory comprises: scanning the files in the "Default" sub-directory to acquire a scanning result, and/or, performing second processing on a directory in the "Default" sub-directory; and the second processing at this moment comprises: traversing various directories in the "Default" sub-directory, and performing the same processing as the first processing on the traversed directories; and so on. After scanning is performed on the files in the "Default" sub-directory and the files in various levels of non-remapped directories in the "Default" sub-directory, scanning processing on the "Default" sub-directory is completed.

After the scanning processing on the "Default" sub-directory is completed, the "Default User" sub-directory is traversed, and by acquiring the directory attribute thereof, if it is found that a FILE_ATTRIBUI_REPARSE_POINT attribute flag is contained therein, scanning processing is not performed on the "Default User" sub-directory.

By then, the scanning of the files (in the present example, the files in the "Users" directory are empty) in the "Users" directory and the files in various levels of non-remapped directories in the "Users" directory is completed, i.e. the scanning processing on the "Users" directory is completed.

By using the method for scanning files provided in the embodiments of the present invention, it can be determined whether a traversed directory is a remapped directory according to a directory attribute of the directory, and scanning processing is performed on the directory only in the case that the traversed directory is not a remapped directory, so that scanning processing will not be performed repeatedly on the directory with a remapping relationship, which effectively reduces the IO overhead and CPU overhead during scanning, and improves the file scanning efficiency.

Optionally, in an implementation of the present embodiment, a next directory is traversed after it is determined that the traversed directory is a remapped directory, or after the scanning processing on the traversed directory is completed. After that, first processing is performed on the next directory.

Figure 2A:
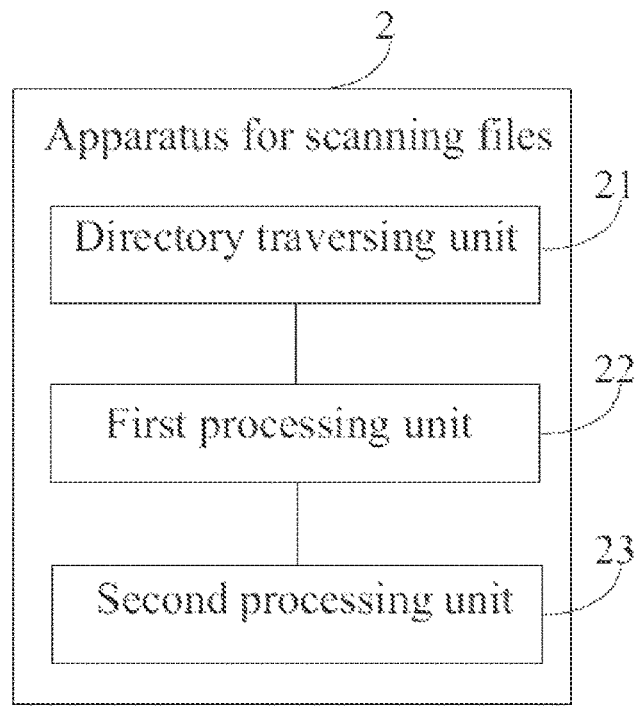
FIG. 2A is a block diagram of an apparatus for scanning files according to an embodiment of the present invention.

FIG. 2A is a block diagram of an apparatus for scanning files according to an embodiment of the present invention, and referring to FIG. 2A, an apparatus 2 for scanning files comprises a directory traversing unit 21, a first processing unit 22 and a second processing unit 23, which are respectively described as follows.

The directory traversing unit 21 is used for traversing a directory. For example, traversing is performed on a directory in a specific path.

The first processing unit 22 is used for performing first processing on the directory traversed by the directory traversing unit 21. The first processing comprises: acquiring a directory attribute of the traversed directory; and determining whether the traversed directory is a remapped directory according to the acquired directory attribute, and if so, performing no scanning processing on the traversed directory, and if not, performing scanning processing on the traversed directory. The scanning processing comprises: scanning various files in the traversed directory to acquire a scanning result, and/or, invoking the second processing unit 23 to perform processing on various sub-directories in the traversed directory.

The second processing unit 23 is used for traversing various sub-directories in the traversed directory, and performing the same processing as the first processing on the traversed sub-directories.

In the present embodiment, after the first processing unit 22 completes scanning on various files in the traversed directory and the files in various levels of non-remapped directories in the traversed directory, the first processing unit 22 completes the processing scanning on the traversed directory.

Figure 2B:
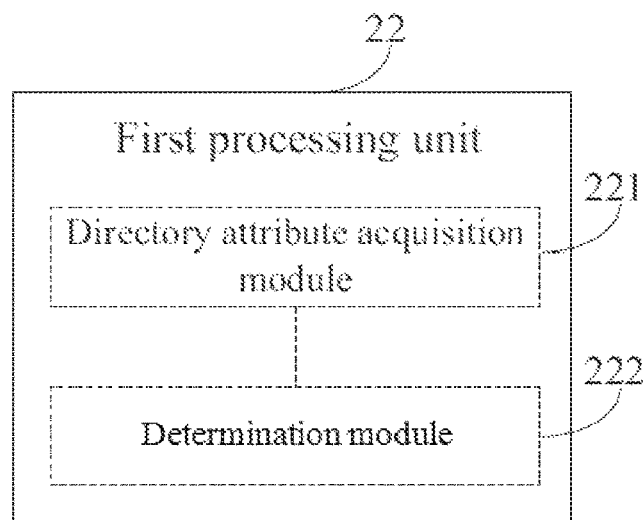
FIG. 2B is a block diagram of a first processing unit of an apparatus for scanning files shown in FIG. 2A.

Optionally, in an implementation of the present embodiment, as shown by a dashed box in FIG. 2B, the first processing unit 22 may comprise a directory attribute acquisition module 221 for acquiring (for example, acquiring through a Microsoft Windows operating system application program interface) a directory attribute of the traversed directory.

Optionally, in an implementation of the present embodiment, as shown by a dashed box in FIG. 2B, the first processing unit 22 may comprise a determination module 222 for determining whether the traversed directory is a remapped directory according to a directory attribute acquired by the first processing unit 22. For example, determining whether the traversed directory is a remapped directory based on whether a FILE_ATTRIBUTE_REPARSE_POINT attribute flag is contained in the directory attribute, and if it is contained, the traversed directory is a remapped directory; and if it is not contained, the traversed directory is not a remapped directory.

With regard to the second processing unit 23, when traversing each sub-directory thereof, and on the traversed sub-directory, a directory attribute of the sub-directory is acquired and whether it is a remapped directory is judged, and if so, scanning processing is not performed on the sub-directory, otherwise, scanning processing is performed. The scanning processing at this moment comprises: scanning the files in the sub-directory to acquire a scanning result, and/or, invoking the second processing unit 23 to traverse a directory in the sub-directory and performing the same processing as the first processing on the traversed directory; and so on until the scanning of the files in the sub-directory and the files in the various levels of non-remapped directories in the sub-directory is completed.

Using the apparatus 2 for scanning files provided in the embodiments of the present invention, it can be determined whether a traversed directory is a remapped directory according to a directory attribute of the directory, and scanning processing is performed on the directory only in the case that the traversed directory is not a remapped directory, so that scanning processing will not be performed repeatedly by the apparatus 2 for scanning files on the directory with a remapping relationship, which effectively reduces the 10 overhead and CPU overhead during scanning, and improves the file scanning efficiency.

Optionally, in an implementation of the present embodiment, the directory traversing unit 21 is further used for traversing to a next directory after the first processing unit 22 determines that the traversed directory is a remapped directory, or after the first processing unit 22 completes the scanning processing on the traversed directory.

The conditions, processing methods and logical relationships and so on defined in the method embodiments of the present invention are equally applicable to the apparatus embodiments of the present invention, which will not be described here.

Through the description of the foregoing embodiments, those of ordinary skill in the art may clearly understand that the present invention may be implemented through a platform combined with software and hardware. Based on this understanding, some or all of the technical solutions of the present invention which contribute to the background art may be embodied in the form of a software product, and the computer software product may be stored in a storage medium such as a ROM/RAM, a magnetic disc or an optical disc, etc., and contains various instructions for causing a computer device (which may be a personal computer, a server, a smart phone, a network device, or the like) to execute the methods of various embodiments or certain portions of the embodiments of the present invention.

The terminology and phraseology used in the description of the present invention are for illustration only, and are not meant to constitute limitations. Those of ordinary skill in the art shall understand that various changes may be made to the details in the above-mentioned embodiments without departing from the basic principles of the disclosed embodiments. Therefore, the scope of the present invention is merely determined by the claims, and in the claims, unless otherwise specified, all terminology should be understood according to the broadest and the most reasonable meaning.

The invention claimed is:

1. A method for scanning files during a traversing of a directory, content under the directory including a file, a sub-directory, or a combination thereof, the method comprising:
   acquiring a directory attribute of the traversed directory based on one or more values returned by a standard file Application-Program-Interface (API) function call of an operating system of a computer;
   determining whether the returned values include a FILE_ATTRIBUTE_REPARSE_POINT attribute flag;
   performing no scanning processing on the content under the traversed directory based upon a determination that the returned values include the FILE_ATTRIBUTE_REPARSE_POINT attribute flag; and
   performing scanning processing on the traversed directory based upon a determination that the returned values do not include the FILE_ATTRIBUTE_REPARSE_POINT attribute flag,
   wherein said determining includes:
      determining whether the FILE_ATTRIBUTE_REPARSE_POINT attribute flag is included in the acquired directory attribute;
      identifying the traversed directory as being a remapped directory based upon a determination that the attribute flag is included in the acquired directory attribute; and
      identifying the traversed directory as not being a remapped directory based upon a determination that the attribute flag is not included in the acquired directory attribute.

2. The method of claim 1, wherein said performing the scanning processing includes scanning at least one file in the traversed directory to acquire a scanning result.

3. The method of claim 1, wherein said performing the scanning processing includes processing a selected sub-directory in the traversed directory.

4. The method of claim 3, wherein said processing the selected sub-directory includes:
   traversing the selected sub-directory;
   acquiring a sub-directory attribute of the traversed sub-directory;
   determining whether the traversed sub-directory is a remapped sub-directory according to the acquired sub-directory attribute;
   performing no scanning processing on the traversed sub-directory based upon a determination that the traversed sub-directory is the remapped sub-directory; and
   performing scanning processing on the traversed sub-directory based upon a determination that the traversed sub-directory is not the sub-remapped directory.

5. The method of claim 1, wherein said acquiring the directory attribute comprises acquiring the directory attribute through a Microsoft Windows operating system application program interface.

6. The method of claim 1, further comprising traversing to a next directory based upon a determination that the traversed directory is a remapped directory.

7. The method of claim 1, further comprising traversing to a next directory after said acquiring, said determining, said performing no scanning processing and performing the scanning processing are completed.

8. An apparatus for scanning files during a traversing of a directory, content under the directory including a file, a sub-directory, or a combination thereof, the apparatus comprising:
   a processor; and
   a memory having one or more programs stored thereon for instructing said processor, the programs including:
   instruction for traversing of the directory;
   instruction for acquiring a directory attribute of the traversed directory based on one or more values returned by a standard file Application-Program-Interface (API) function call of an operating system of a computer;
   instruction for determining whether the returned values include a FILE_ATTRIBUTE_REPARSE_POINT attribute flag,
   instruction for determining whether the FILE_ATTRIBUTE_REPARSE_POINT attribute flag is included in the acquired directory attribute, identifying the traversed directory as being a remapped directory based upon a determination that the attribute flag is included in the acquired directory attribute, and identifying the traversed directory as not being a remapped directory based upon a determination that the attribute flag is not included in the acquired directory attribute;
   instruction for performing no scanning processing on the content under the traversed directory based upon a determination that the returned values include the FILE_ATTRIBUTE_REPARSE_POINT attribute flag; and
   instruction for performing scanning processing on the traversed directory based upon a determination that the returned values do not include the FILE_ATTRIBUTE_REPARSE_POINT attribute flag.

9. The apparatus of claim 8, wherein said processor is adapted for performing the scanning processing includes scanning at least one file in the traversed directory to acquire a scanning result.

10. The apparatus of claim 8, wherein the programs include instruction for traversing a selected sub-directory in the traversed directory, acquiring a sub-directory attribute of the traversed sub-directory, determining whether the traversed sub-directory is a remapped sub-directory according to the acquired sub-directory attribute, performing no scanning processing on the traversed sub-directory based upon a determination that the traversed sub-directory is the remapped sub-directory and performing scanning processing on the traversed sub-directory based upon a determination that the traversed sub-directory is not the sub-remapped directory.

11. The apparatus of claim 8, wherein said processor is adapted for acquiring the directory attribute through a Microsoft Windows operating system application program interface.

12. The apparatus of claim 8, wherein said processor is adapted for traversing to a next directory based upon a determination that the traversed directory is a remapped directory.

13. The apparatus of claim 8, wherein said processor is adapted for traversing to a next directory based upon a determination that said acquiring, said determining, said performing no scanning processing and performing the scanning processing are completed.

14. A non-transitory computer storage medium including at least one program for scanning files during a traversing of a directory when implemented by a processor, the directory containing a file, a sub-directory, or a combination thereof, the at least one program comprising:

instruction for acquiring a directory attribute of the traversed directory based on one or more values returned by a standard file Application-Program-Interface (API) function call of an operating system of a computer;

instruction for determining whether the returned values include a FILE_ATTRIBUTE_REPARSE_POINT attribute flag, instruction for determining whether the FILE_ATTRIBUTE_REPARSE_POINT attribute flag is included in the acquired directory attribute, identifying the traversed directory as being a remapped directory based upon a determination that the attribute flag is included in the acquired directory attribute, and identifying the traversed directory as not being a remapped directory based upon a determination that the attribute flag is not included in the acquired directory attribute;

instruction for performing no scanning processing on the content under the traversed directory based upon a determination that the returned values include the FILE_ATTRIBUTE_REPARSE_POINT attribute flag; and instruction for performing scanning processing on the traversed directory based upon a determination that the returned values do not include the FILE_ATTRIBUTE_REPARSE_POINT attribute flag.

15. The computer storage medium of claim 14, wherein said instruction for performing the scanning processing includes instruction for scanning at least one file in the traversed directory to acquire a scanning result.

16. The computer storage medium of claim 14, wherein said instruction for performing the scanning processing includes instruction for processing a selected sub-directory in the traversed directory.

17. The computer storage medium of claim 16, wherein said instruction for processing the selected sub-directory includes:

instruction for traversing the selected sub-directory;

instruction for acquiring a sub-directory attribute of the traversed sub-directory;

instruction for determining whether the traversed sub-directory is a remapped sub-directory according to the acquired sub-directory attribute;

instruction for performing no scanning processing on the traversed sub-directory based upon a determination that the traversed sub-directory is the remapped sub-directory; and instruction for performing scanning processing on the traversed sub-directory based upon a determination that the traversed sub-directory is not the sub-remapped directory.

18. The computer storage medium of claim 14, wherein said instruction for acquiring the directory attribute comprises instruction for acquiring the directory attribute through a Microsoft Windows operating system application program interface.

* * * * *